United States Patent

[11] 3,563,350

| [72] | Inventor | Heinz Leiber<br>Leimen, Germany |
|---|---|---|
| [21] | Appl. No. | 796,337 |
| [22] | Filed | Feb. 4, 1969 |
| [45] | Patented | Feb. 16, 1971 |
| [73] | Assignee | Teldix GmbH<br>Heidelberg, Germany |

[54] ANTISKID BRAKE CONTROL SYSTEM
9 Claims, 6 Drawing Figs.

[52] U.S. Cl. ................................................ 188/181,
303/21
[51] Int. Cl. ................................................... B60t 8/04
[50] Field of Search ..................................... 188/181,
181A; 303/6, 21, 24

[56] References Cited
UNITED STATES PATENTS
3,456,989  7/1969  Stevens ....................... 188/181

Primary Examiner—George E. A. Halvosa
Assistant Examiner—John J. McLaughlin
Attorney—Spencer & Kaye ABSTRACT: An antiskid brake control system for preventing the wheels of a braked vehicle from locking. The system is of the type which produces an electrical signal in dependence upon the rotational deceleration of the wheels of the vehicle and reduces the braking force applied to the decelerating wheel or wheels upon occurrence of this signal. According to the invention, this antiskid brake control system is provided with means for inhibiting the electrical signal when the rotational speed of the brake-regulated wheel or wheels exceeds a prescribed value. This inhibiting or blocking means renders aperiodic the operation of the antiskid brake control system.

Patented Feb. 16, 1971

INVENTOR.
Heinz Leiber
BY Spencer & Kaye
ATTORNEYS

Patented Feb. 16, 1971

INVENTOR.
Heinz Leiber

BY Spencer & Kaye

ATTORNEYS

ANTISKID BRAKE CONTROL SYSTEM

BACKGROUND OF THE INVENTION

The present invention relates to a brake control system for preventing wheel locking of braked wheels on wheeled vehicles, or a so-called "antiskid" brake control system. More particularly, the present invention relates to an antiskid brake control system of the type provided with a "deceleration sensor." Such antiskid brake control systems are already known in the art and function, with the deceleration sensor, to produce an electrical signal when the rotational deceleration of a regulated braked wheel attains or exceeds a value which is known, from experience, to indicate that the wheel will lock. This electrical signal controls a device, such as an electromagnetically actuated valve in an outlet line, that reduces the instantaneous effective brake pressure applied thereto to a value which allows the wheel to accelerate again to a rotational speed corresponding to the linear speed of the vehicle.

Experience has shown that the rotational decelerations and accelerations of the wheels of a vehicle provided with an antiskid brake control system of this type occur in a more or less periodic manner during the time that the vehicle is braked. If the characteristic frequencies of the members of the vehicle chassis or, in particular, those of the steering linkage and the wheel suspension match the frequency of the periodic brake control processes - that is, the so-called "brake control frequency" - the vehicle chassis oscillations will be reinforced and driven to impermissibly high amplitudes. Such vehicle oscillations not only can cause disturbing noises but can also result in an increased danger of breaking a structural member of the vehicle; that is, these oscillations result in a clear reduction in the safety factor of operation.

Various solutions have already been proposed for this problem of brake-reinforced vehicle chassis oscillations. The German Pat. No. 1,011,290, for example, teaches the technique of inserting damping means in the pressure control line of a hydraulic brake system for aircraft wheels. This damping means reduces the shock of the changes in pressure and, therefore in turn, the corresponding variations in braking force applied to the wheels.

SUMMARY OF THE INVENTION

An object of the present invention, therefore, is to provide an antiskid brake control system which does not contribute to reinforced oscillations of the vehicle chassis. In contrast to the solutions of the prior art, it is a particular object of the present invention to solve this resonance problem by eliminating the cause; that is, by providing an antiskid brake control system having a fundamentally nonperiodic or aperiodic operation.

These objects, as well as other objects which will become apparent in the discussion that follows, are achieved, according to the present invention, by providing an antiskid brake control system with a blocking device which inhibits - either by preventing the transmission or preventing the production of - the rotational deceleration-dependent signal when the rotational speed of the regulated wheel lies above a prescribed value or threshold.

When a vehicle, incorporating the antiskid brake control system according to the present invention, is braked while traveling at full speed, the rotational speed of the wheels will initially exceed this prescribed threshold. The reduction in the brake pressure will therefore not be initiated when the deceleration sensor is actuated but will be delayed until the speed of the regulated decelerating wheel or wheels drops below the threshold. After the brake pressure is reduced, the regulated wheels will accelerate again until their rotational speed corresponds to the linear speed of the vehicle. However, by this time the speed of the vehicle will have fallen somewhat so that, during the next brake control cycle, it will no longer take as long, from the moment of appearance of the deceleration-dependent signal, for the wheel or wheels to decelerate to a speed below the threshold speed. It will also take a shorter time for the wheels to return to a rotational speed corresponding to the vehicle speed during each successive cycle since the vehicle speed will be constantly falling. As a result, each successive operating cycle of the antiskid brake control system will be shorter than the preceding one until the vehicle has decelerated to such a degree that its wheels can no longer exceed the threshold rotational speed. Because the brake control frequency will thus be continuously changing, if the value of the threshold speed is chosen to be lower than the speed at which the chassis vibration can occur, the danger of resonance will be eliminated. The frequency of operation of the brake control system according to the present invention will therefore not be permitted to remain equal to the characteristic frequency of the vehicle chassis.

Depending upon the construction of the antiskid brake control system and, in particular, upon the degree to which the system operates electrically as opposed to mechanically, the present invention can be realized in a number of different ways. In principle, the inhibiting or blocking device can be simply a switch inserted in the path of the rotational deceleration-dependent signal ("deceleration signal") which opens when the rotational speed of the vehicle wheel or wheels exceeds the prescribed threshold value noted above. The switch can be constructed as a simple mechanical contact operated by centrifugal force or as an electronic switch, e.g. of the type having a prescribed gating threshold voltage, which is controlled by a speed-proportional voltage.

In a particular preferred embodiment of the antiskid brake control system according to the present invention, the brake pressure applied to the wheel brake cylinders is regulated by individually controllable inlet and outlet valves which connect the brake cylinders with a source and a sink of fluid pressure, respectively. In such a system the deceleration signal is supplied to both valves simultaneously by connecting the valves in parallel. With this type of arrangement the speed-dependent switch can be inserted in the parallel branch containing the outlet valve. When the speed-dependent switch is open, the deceleration signal will be operative to actuate only the inlet valve, whereas, when this switch is closed, it will actuate both the inlet and the outlet valves.

With this antiskid brake control system just described, the inlet valve is normally open and the outlet valve normally closed - that is, when in their nonactuated states. When the wheel or wheels exhibit excessive rotational deceleration and produce the deceleration signal, the inlet valve will initially close and prevent an increase in the brake pressure at the wheel brake cylinder or cylinders. Thereafter, when the speed of the wheel or wheels drops below the threshold speed and closes the speed-dependent switch, the outlet valve will open to reduce this brake pressure and permit the wheel or wheels to accelerate. As will be discussed in greater detail below, this embodiment prevents or cuts off the sharp peaks in brake pressure which would otherwise occur if both the inlet and outlet valves were actuated simultaneously.

If the present invention is to be applied to an antiskid brake control system of the type which utilizes a mechanical device for sensing rotational deceleration and for producing the deceleration signal, the invention may be realized in an especially advantageous manner if the blocking device be constructed to inhibit the production of the deceleration signal.

The sensing device of such an antiskid control system contains a drive member connected to rotate upon rotation of the braked vehicle wheel or wheels, and a driven member connected to rotate upon rotation of the drive member. The driven member is held in spring-restrained relationship with the drive member to allow a relative rotation between the driven member and the drive member when the drive member decelerates. Cooperating electrical contact elements are provided on the two respective members and connected to close a circuit when the deceleration of the drive member reaches a prescribed threshold value.

According to the present invention, the electrical contact element on the drive member is replaced by a lever arranged on the drive member in such a way as to pivot with respect to the drive member about an axis which is parallel to the drive member axis. If the lever is situated so that its center of gravity is offset, both from its own pivot axis and the axis of rotation of the drive member, this lever will be swung outward against the force of a biasing spring by centrifugal force upon rotation of the drive member. Since the lever forms one of the electrical contact elements which produce the deceleration signal and since this lever swings out of the range of electrical contact given a sufficient rotational speed, no deceleration signal will be produced at all when the drive member rotates faster than this given speed.

According to a particular preferred construction of this sensing device according to the present invention, the ranges of movement of the two electrical contact elements formed by the lever on the drive member and the contact element on the driven member overlap. With this arrangement, as the lever is swiveled outward under the influence of centrifugal force, the driven member must rotate with respect to the drive member by an increasingly greater angle before the electrical contact elements can touch. Since the angle of rotation of the driven member with respect to the drive member is a direct function of the rotational deceleration, an increasingly greater deceleration is required to produce a deceleration signal with increasing rotational speed.

When the rotational speed and thus the centrifugal force is sufficiently great to move the lever out of the range of overlap, the deceleration signal will be completely inhibited.

With the preferred embodiment just described, the consecutive brake controls cycles will not only become shorter, and thus be aperiodic, when the speed of the drive member is above, but also when its speed is below the threshold speed of rotation.

It is clearly undesirable if the rotational accelerations and decelerations of the drive member result in a torque about the pivot axis of the lever. Such torques can be avoided if the lever is pivoted so that lines drawn from its center of gravity to the respective axes of the lever and the drive member form approximately a right angle. In one position of the lever, when the angle is exactly a right angle, the accelerations and decelerations of the drive member will produce no torque at all. In the other positions within the range of movement of the lever, small torques will arise; however, these torques will be practically insignificant compared to the centrifugal force acting on the lever and, in fact, can be used to advantage to help correct the dependence of the rotational deceleration threshold value upon the rotational speed of the sensed wheel.

A sensing device of the type described above which employs a lever will also be affected by linear accelerations and decelerations acting perpendicular to the drive member axis. In order to prevent any interruptions in the proper operation of the system due to sudden vertical movements of the wheels of the vehicle as they pass over uneven pavement, it is suggested that the sensing device be attached to the vehicle with a vertically oriented drive member axis. Since the vehicle accelerations and decelerations in the horizontal plane will not be large, it is a simple matter to construct the sensing device so that these outside influences will have no effect on its operation. The "bumps" in the pavement, which result in strong accelerations of the wheels of a vehicle in the vertical direction, will then act only in the direction of the lever axis and will produce no torques in the lever.

DESCRIPTION OF THE PREFERRED EMBODIMENTS

Figure 1:
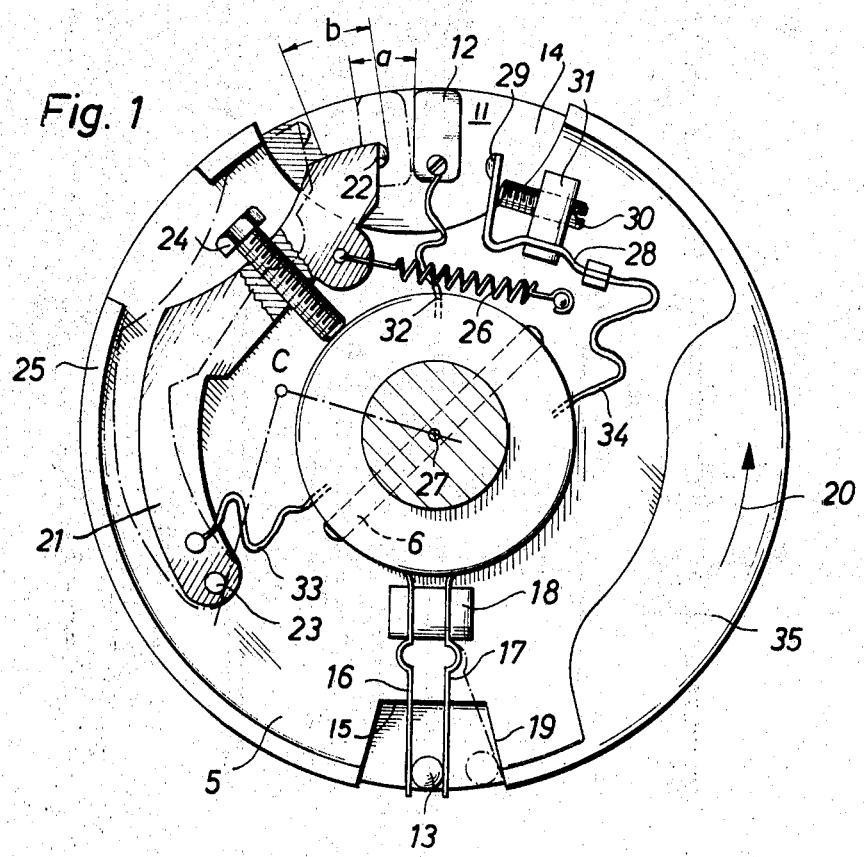
FIG. 1 is a partly representational, partly schematic diagram, in end view, of a mechanical sensing device which functions simultaneously as a rotational deceleration sensor and as a blocking device according to the present invention.
Figure 2:
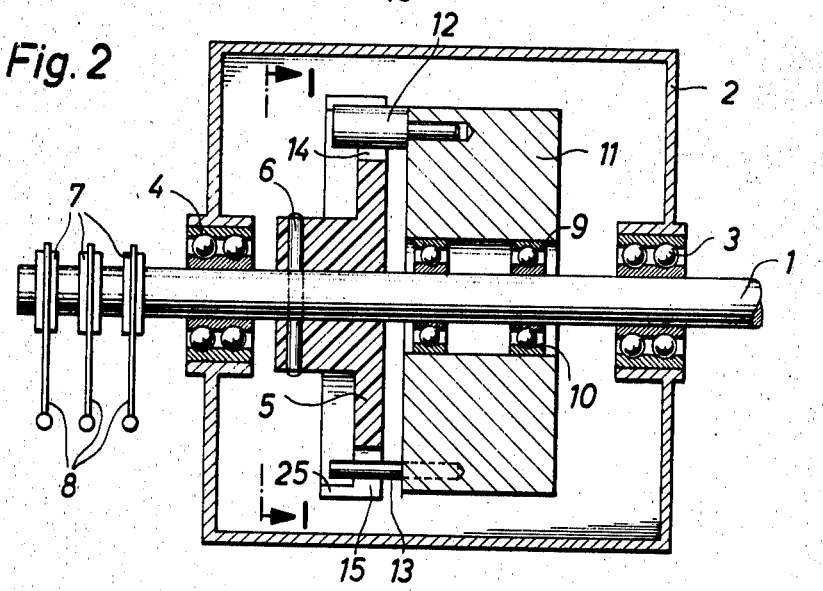
FIG. 2 is a partly representational, partly schematic diagram of the sensing device of FIG. 1, viewed in axial section and in somewhat reduced scale.

The preferred embodiments of the present invention will now be described in connection with FIGS. 1 to 6 of the drawings. FIGS. 1 and 2 thereof, taken together, illustrate the construction of a sensing device which functions as a rotational acceleration and deceleration sensor and incorporates the rotational speed-dependent blocking device according to the present invention.

FIG. 2 shows a drive member, consisting of a shaft 1, which passes through a housing 2 mounted stationary with the vehicle and rotates in ball bearings 3 and 4, and a disc or plate 5 made of insulating material and attached to the shaft 1 by means of a pin 6. The disc serves as a support for various electrical switch elements of the device. For the sake of simplicity, these switch elements have not been illustrated in FIG. 2. Although shown horizontal, the drive member is preferably mounted in the vehicle in the vertical position.

The switch elements mounted on the disc 5 are connected by means of electrical conductors (not shown) to the three slip rings 7 arranged on the shaft 1. These slip rings are in continuous electrical contact with respective ones of three stationary brushes 8.

An additional rotatable member 11 is mounted on the shaft 1 by means of the ball bearings 9 and 10. An electrical contact pin 12 and a limit stop pin 13 are fastened to the rotatable member 11 to protrude axially toward the disc 5 at diametrically opposite positions around its circumference. They project into suitable recesses 14 and 15 at the circumference of the disc 5.

The top of disc 5 as seen from the cross-sectional line 1—1 of FIG. 2 is shown in FIG. 1. The faces or ends of the pins 12 and 13 are visible in FIG. 1 through the recesses 14 and 15 in the disc 5. Two flat springs 16 and 17, which are inserted in a mounting block 18 attached to the plate 5, are arranged to maintain tension against opposite sides of the limit stop pin 13. These springs therefore serve to restrain the rotatable member 11 from rotating with respect to the plate 5. Because of the elasticity of the springs, however, the angular position of the rotatable member with respect to the plate serves as a measure of the rotational acceleration or deceleration of the plate.

If the member 11 rotates to the left with respect to the disc 5 in the direction indicated by the arrow 20 shown in FIG. 1, the limit stop pin 13 will abut the right boundary 19 of the recess 15 (the position shown in dot-dashed lines). This freedom of movement between the normal position of the rotatable member 11 with respect to the plate 5 and its limit position toward the left determines the range of movement $a$ of the contact pin 12 when the controlled wheel of the vehicle and, in turn, the disc 5 undergo rotational deceleration. It is assumed, in this connection, that the shaft 1 is driven by the wheel in the counterclockwise direction when the vehicle is traveling forward.

In addition, the plate 5 carries a lever 21 with a contact bead 22. This member is rotatably mounted on the plate about a pin 23. A limit stop screw 24 maintains the lever 21 a minimum distance away from the hub and, when the lever swings outward, it comes to rest against, and is therefore limited by, the elevated edge 25 of the disc. These means for determining the internal and external limits of movement of the lever 21 therefore determine the range of movement $b$ of the contact bead 22. A restraining spring 26 biases the lever toward the right so that its limit stop screw 24 normally rests against the hub of the disc 5.

The center of gravity of the lever 21 lies at a point designated in FIG. 1 with the letter C. This point is so positioned, when the limit stop screw 24 of the lever 21 abuts the hub, that lines drawn from this point to the shaft axis 27 and to the axis of the pin 23 lie approximately perpendicular to each other. An exact right angle is shown by the dot-dashed lines in FIG. 1 with one arm of this angle passing to the immediate right of the pin 23. Therefore, with a slight outward deflection of the lever 21 it will lie in an exactly neutral position where its motion is unaffected by the rotational accelerations or decelerations of the disc 5. If the lever is swiveled to its extreme outward position, a rotational deceleration of the disc 5 will result in a counterclockwise force about the lever axis tending to maintain the lever in its outward position. This effect is very small, however, and can be neglected. With the arrangement shown in FIG. 1, the movements of the lever 21 are practically independent of rotational accelerations and decelerations about the drive axis 27.

A bent contact spring 28 which carries a contact bead 29 is also mounted on the plate 5 with the aid of a mounting block 31. This mounting block is provided with an adjustment screw 30 for adjusting the position of the contact bead 29. Upon rotational acceleration of the drive shaft 1, the contact bead will make electrical contact with the contact pin 12 of the member 11. The contact pin 12, the lever 21 and the contact spring 28 are each electrically connected with an individual slip ring 7 (FIG. 2) by a separate flexible conductor 32, 33 and 34, respectively.

The disc 5 is provided with a segment 35 of increased thickness which serves as a counterweight for the lever 21; this segment 35 therefore balances the disc with respect to the drive axis 27.

Assuming, as noted above, that the shaft 1 and the plate 5 rotate in the direction indicated by the arrow 20 - that is, toward the left - when the wheeled vehicle is traveling in the forward direction, the sensing device shown in FIGS. 1 and 2 will operate in the following manner: As long as the vehicle speed is small - that is, not larger than 5 kilometers per hour - the centrifugal force acting on the lever 21 will not be sufficient to overcome the force of the spring 26. The lever 21 will therefore remain in the position shown in FIG. 1.

If the disc 5 is subjected to a rotational deceleration, the flat spring 17 will deflect and allow the rotatable member 11 to revolve to the left with respect to the disc 5. The spring 17 is made sufficiently flexible so that this respective rotation will already occur with a rotational deceleration corresponding to a linear vehicle deceleration of approximately 1.8 $g$. The contact pin 12 will then make electrical contact with the contact bead 22 of the lever 21 to close an electrical circuit and provide the "deceleration signal" for the antiskid brake control system.

If the rotational speed of the disc 5 is greater than 5 kilometers per hour, the lever 21 will be swiveled outward from its normal position shown in FIG. 1. The greater the speed, the farther the lever 21 will be swiveled. Since, when the lever 21 is swiveled, the contact pin 12 must move an increased distance before contact with the bead 22, a greater rotational deceleration is required to close the circuit with increased speed. In this preferred embodiment of the present invention, the switching device is so constructed that movement of the rotatable member 11 over the full distance $a$ in the deceleration direction requires a rotational deceleration corresponding to a vehicle deceleration of approximately 4.5 $g$. When this occurs, the limit stop pin 13 will lie against the edge 19 of the recess 15 and the contact pin 12 will assume the position indicated in dot-dashed lines.

When the rotatable member 11 has been rotated to the left to this limiting position under the force of deceleration, the contact pin 12 will remain in contact with the contact bead 22 on the lever 21 so long as the vehicle speed lies below approximately 35 kilometers per hour. This linear speed corresponds to the so-called "threshold" speed of rotation $v_{th}$ of the drive shaft 1. If this threshold speed is exceeded, the lever 21 will be moved so far outward under the influence of centrifugal force that, no matter how large the rotational deceleration of the system may be, electrical contact between the contact pin 12 and the bead 22 will no longer be possible. With still further increases in the rotational speed of the drive shaft 1 and the plate 5 the lever 21 will come to rest against the edge 25 of the plate.

If the drive members of the switching device are subjected to rotational acceleration, the rotatable member 11 will revolve toward the right, deflecting outward the flat spring 16. If the rotational acceleration has an order of magnitude approximating a linear vehicle acceleration of about 0.8 $g$, the contact pin 12 will make contact with the contact bead 29 on the contact spring 28, close an electrical circuit and provide the "acceleration signal" for the antiskid brake control system.

Figure 3:
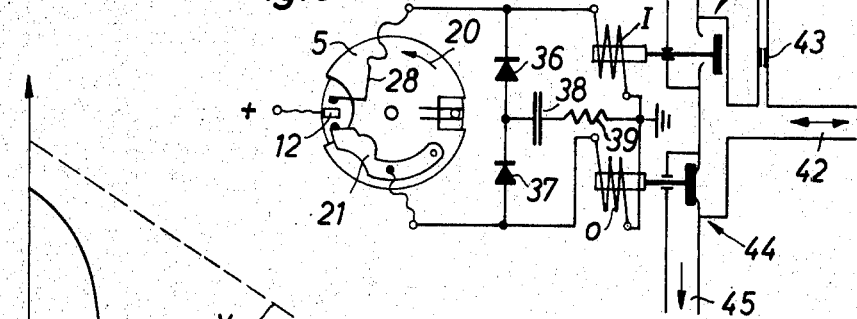
FIG. 3 is a mechanical, electric and hydraulic schematic diagram of an antiskid brake control system employing the sensing device of FIGS. 1 and 2.

FIG. 3 schematically illustrates the mechanical, electrical and hydraulic elements of the brake control system according to this preferred embodiment of the present invention. The sensing device of FIGS. 1 and 2 is again shown in simplified form and reduced scale. The direction of rotation of the disc 5 indicated by the arrow 20 again corresponds to the direction resulting from forward movement of the vehicle.

The contact pin 12 of the sensing device is connected with a voltage source indicated by the "+". The lever 21 and the contact spring 28 are connected to ground via the windings 0 and I, respectively, of individual electromagnetically actuated valves. Although the external connections of the device are actually made via slip rings and brushes, for reasons of clarity these slip rings and brushes have been excluded from FIG. 3. The two electrical conductors that interconnect the respective elements 21 and 28 of the sensing device with the windings 0 and I are connected together by two series-arranged diodes 36 and 37. The diodes are poled so as to permit the flow of current from the lever 21 to the valve winding I. The point between the two diodes is connected to ground via a capacitor 38 and resistor 39 arranged in series.

The valve winding I belongs to a so-called "inlet valve" which is designated in FIG. 3 with number 40. This valve is normally open so that, when the winding I is excited, the valve element closes the path from a main brake pressure line 41 to a line 42 that leads to a wheel brake cylinder or cylinders. As shown in FIG. 3, the inlet valve is bypassed by a connecting line which contains a restriction 43. This bypass enables a small quantity of brake fluid to flow from the main pressure line 41 to the line 42, even when the inlet valve 40 is closed.

The valve winding 0 forms a part of a so-called "outlet valve" 44. This valve is biased in the closed position and opens only upon excitation of the winding 0. This outlet valve lies in an outlet line 45 which connects the line 42, and thus the wheel brake cylinders, with a "sink" of pressure; that is, with a point of substantially lower pressure such as an intermediate storage container or a brake fluid reservoir.

The operation of the antiskid brake control system shown in FIG. 3 will now be described in connection with FIG. 4 which is a time diagram showing the time dependence of a number of system variables. On the top of the diagram is indicated the actual rotational speed $v_w$ of the vehicle wheel, the brake pressure of which is being regulated by the antiskid brake control system of FIG. 3. This rotational speed $v_w$ also represents the rotational speed of the shaft 1 and the drive disc 5 of the sensing device according to the present invention. $v_r$, shown in dashed lines, indicates the speed of the vehicle and thus represents the theoretical circumferential speed of the wheel and, in turn, the rotational speed of the shaft 1 which would occur were the wheel not subjected to a braking force. The speed $v_v$ falls with increasing time because the vehicle is being braked.

The threshold speed of rotation $v_{th}$, which has been mentioned above, is also indicated in FIG. 4. When $v_w$ is greater than $v_{th}$, contact can not be made between the contact pin 12 and the bead 22 of the lever 21. Therefore, no matter how great the rotational deceleration of the wheel, the sensing device will produce no deceleration signal.

Figure 4:
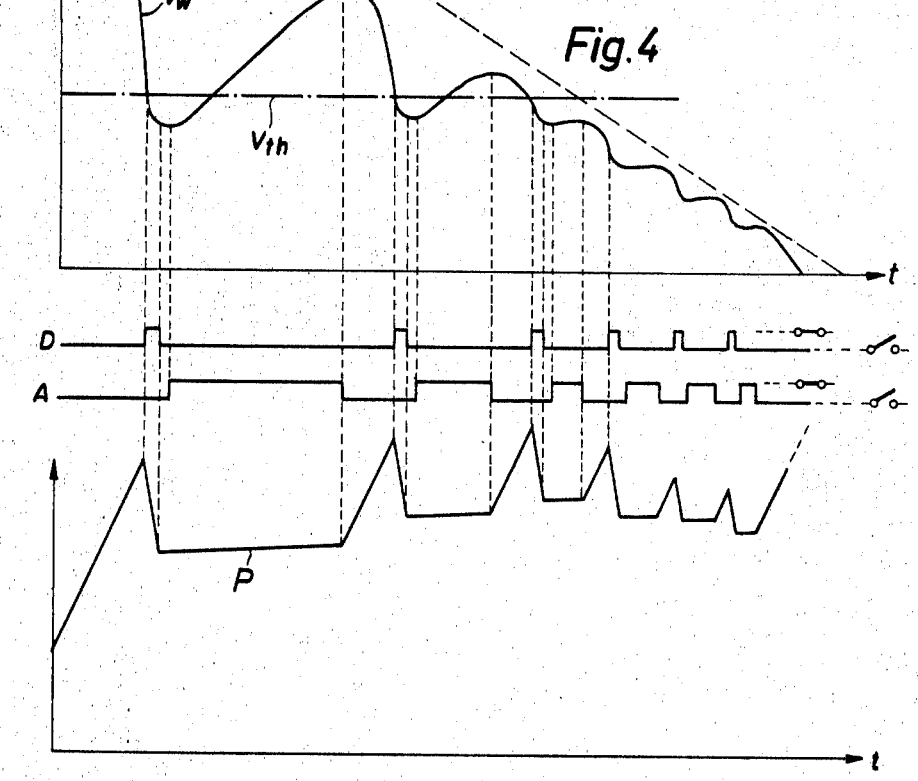
FIG. 4 is a time diagram which illustrates the operation of the brake control system of FIG. 3.

In the center of FIG. 4 is illustrated the operation of the sensing device switches. The line designated with the letter D indicates the operation of the deceleration contact formed by the interaction of the contact pin 12 with the contact bead of the lever 21. The line designated with the letter A illustrates the operation of the acceleration contact; that is, the periods of contact between the contact pin 12 and the contact spring 28. The right-hand side of each line is provided with switching symbols that show when the respective contacts are closed and when they are open.

Finally, at the bottom of FIG. 4 is illustrated the time dependence of the brake pressure P for the same braking process that is shown in the remainder of FIG. 4.

The antiskid brake control system illustrated in FIG. 3 operates as follows: Initially, when the vehicle is traveling at full speed, the rotational speed $v_w$ of the disc 5 lies far above the threshold speed $v_{th}$. When the vehicle is braked, the pressure produced in the line 41 is transmitted through the open inlet valve to the line 42 and to the wheel brake cylinders.

This fluid pressure functions to apply the brakes and thus results in a deceleration of the vehicle. This deceleration is indicated in FIG. 4 by the falling dashed line $v_r$. Because of the normal slippage between the wheels of the vehicle and the pavement, the wheel speed $v_w$ will lie below the vehicle speed $v_r$, as is indicated at the far left of the diagram of FIG. 4.

The pressure P of the brake fluid at the wheel brake cylinders initially rises in dependence upon the pressure established by the driver of the vehicle. If the brake pressure chosen by the driver is too great, one or more wheels of the vehicle will begin to lock. The speed $v_w$ of each such wheel will then quickly begin to fall as shown in FIG. 4. Already before the curve $v_w$ reaches its steepest fall, the threshold value of rotational deceleration—corresponding to a linear deceleration of 4.5 $g$—may be exceeded so that the contact pin 12 of the sensing device will travel its full permissible distance $a$ and come to rest. Contact with the bead 22 of the lever 21 will not yet occur, however, since this lever will initially be in its fully extended position.

As the speed $v_w$ of the disc 5 falls and reduces the centrifugal force, the lever 21 will be allowed to move inward until, when $v_w$ falls below $v_{th}$, its contact bead 22 will touch the contact pin 12. This closing of the electrical circuit causes a voltage to be applied to the two valve windings O and I; the latter winding will receive this voltage through the path containing the diodes 36 and 37. Both the outlet and the inlet valves will then be simultaneously actuated and the fluid pressure P in the wheel brake cylinder or cylinders will escape through the lines 42 and 45.

As a result of the drop in pressure, the wheel decelerations will be quickly reduced and the curve $v_w$ of the rotational speed will bend upward as shown in FIG. 4. The rotatable member 11 of the sensing device will return to its normal position under the force of the flat spring 17 so that the "deceleration contact" D formed by the contact pin 12 and the bead of the lever 21 will open.

When the deceleration contact D opens, the outlet valve will be allowed to close again; however, the inlet valve will not yet open since its winding I will receive the discharge current of the capacitor 38 through the diode 36 and the resistor 39. At this stage, therefore, the pressure P at the wheel brake cylinders will be held constant or nearly constant. In reality, this pressure P will be slowly increased by the leakage of brake fluid through the restriction 43 from the line 41 which still remains at the pressure determined by the driver of the vehicle.

After the wheel enters the state of acceleration again, and its acceleration increases sufficiently, the so-called "acceleration contact" A, formed by the contact pin 12 and the contact spring 28, will close. This switching action will have no effect on the pressure P, since the winding I will already be excited. However, the excitation current which was previously produced by the capacitor 38 will now be maintained by the acceleration contact. When, finally, the speed of the wheel $v_w$ approaches the speed of the vehicle $v_v$, its acceleration will drop, allowing the acceleration contact to open. At this point the antiskid brake control system will have terminated a complete cycle and, since the inlet valve 40 will then finally open, the brake pressure P will begin to rise again.

The cycle of operation of the antiskid brake control system, as described above, will then be repeated. However, this second cycle will not last as long as the first, since (1) the initial speed $v_w$ will no longer be as great and (2) the acceleration phase will be shorter than was the case in the first cycle of operation.

The third operating cycle, in the case illustrated in FIG. 4, will begin only after the wheel falls below the threshold speed of rotation and the lever 21 has moved inward to the region where the two ranges of movement $a$ and $b$ (FIG. 1) overlap. The individual switching steps of this third and the following operating cycles will occur in the same order and manner as has been described above. The only difference will be that the drop in the pressure P will not be initiated when the rotational speed of the disc 5 falls below the threshold speed $v_{th}$, but will occur, rather, at the moment the disc 5 has attained sufficient deceleration to close the deceleration contact D. With falling rotational speed, this "threshold" of rotational deceleration will become smaller and smaller as the lever 21 moves inward toward the hub. It will be appreciated that this change in the threshold of deceleration will cause the brake pressure P to drop at an increasingly earlier stage, thus successively shortening the individual operating cycles until the wheel or wheels of the vehicle have come to a standstill.

Although this antiskid brake control system, according to the preferred embodiment of the present invention described above, may permit the wheels to leave skid marks on the pavement of at most a few meters in length, this fact will in no way impair effectiveness of the system. The advantage of the antiskid brake control system according to the invention - namely, its aperiodic operation which eliminates the possibility of reinforcing vehicle chassis oscillations - considerably outweighs the disadvantages of momentarily postponing the reductions in the instantaneous effective brake pressure P.

The embodiment of the present invention illustrated in FIG. 5 closely corresponds with the embodiment just described in connection with FIG. 3. Since the hydraulic system with the inlet valve and the outlet valve are the same, only the inlet valve winding I and the outlet winding O are shown. The arrangement of the diodes and RC element are also the same and have therefore been inserted in FIG. 5 without designating reference numerals.

Whereas in the previous embodiment the sensing device directly inhibited the generation of any deceleration signal when the rotational speed of the wheel exceeded a given threshold, in this embodiment the rotational deceleration-dependent switch D and a separate rotational speed-dependent switch S are connected in series.

Figure 5:
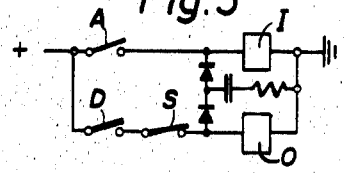
FIG. 5 is a schematic diagram of the electrical circuit of an antiskid brake control system according to another preferred embodiment of the present invention having a separate speed-dependent switch in series with a deceleration-dependent switch.

The switches A, D and S in the embodiment of FIG. 5 can form parts of a fully electronic system which measures speed, acceleration an deceleration without mechanical contacts. For example, the switches A, D and S can be electronic switching devices, such as transistors or the like, which respond to acceleration, deceleration and speed-dependent signals, respectively.

Since a speed-dependent switch may be realized in an especially simple manner by a mechanical switch with a centrifugal force-actuated contact, it may be practical to combine a switch of this type with additional electronic or mechanical switches connected to produce the acceleration and deceleration signals.

The embodiment of the present invention illustrated in FIG. 5 operates in exactly the same manner as does the embodiment illustrated in FIG. 3 and described above.

Figure 6:
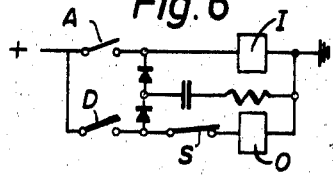
FIG. 6 is a schematic diagram showing a modification of the circuit of FIG. 5.

The elements of the circuit shown in FIG. 6 are identical to those in the circuit of FIG. 5. However, in this case the speed-dependent switch S is arranged between the diode branch and the outlet valve winding O. This modification of the circuit of FIG. 5, which has the speed-dependent switch S connected directly adjacent to the deceleration-dependent switch D, improves the operation of the system by reducing the quantity of brake fluid that is allowed to flow out of the wheel brake cylinders and the line 42 through the outlet valve 44.

As is the case with the previously described embodiments, the deceleration switch D closes when the rotational deceleration of the controlled wheel or wheels exceeds a fixed or speed-dependent threshold value. If the rotational speed of the wheel or wheels still lies above the speed threshold $v_{th}$ so that the switch S be open, only the inlet valve will be actuated. This closing of the inlet valve will initially prevent further increase of the brake pressure P and, when the wheel does fall below the speed threshold and the outlet valve is opened, the pressure P will fall from this constant value.

From this point on, the operating cycle of the antiskid brake control system embodiment of FIG. 6 will proceed in a manner identical to that described above in connection with FIGS. 3 and 4. As a result of this modification of the operating cycle, the peaks of pressure such as those illustrated in FIG. 4 will be removed, or "cutoff." The reductions in pressure will therefore be smaller and less brake fluid will be caused to flow out through the outlet valve 44.

It will be understood that the above description of the present invention is susceptible to various modifications, changes and adaptations.

I claim:

1. In antiskid brake control system having means, responsive to the rotational deceleration of a braked wheel of a vehicle, for producing an electrical signal in dependence upon such deceleration and means responsive to such signal for reducing the instantaneous effective braking force applied to such wheel, the improvement comprising blocking means for inhibiting said signal when the rotational speed of such wheel exceeds a prescribed value.

2. The improvement defined in claim 1 wherein said blocking means inhibits the generation of said signal.

3. The improvement defined in claim 1 wherein said blocking means inhibits the transmission of said signal.

4. The improvement defined in claim 3 wherein said blocking means includes switch means arranged in the path of such signal, said switch means being operative to open when said rotational speed of such wheel exceeds said prescribed value.

5. The improvement defined in claim 4, further comprising, in combination:
   a. a wheel brake associated with such wheel;
   b. a source of fluid pressure connected to said wheel brake;
   c. a sink of fluid pressure connected to said wheel brake;
   d. normally open inlet valve means, connected between said source and said wheel brake, for interrupting the flow of fluid pressure from said source to said wheel brake upon the occurrence of said electrical signal; and
   e. normally closed outlet valve means, connected between said wheel brake and said sink, for passing fluid pressure from said wheel brake to said sink upon the occurrence of said electrical signal when said switch means is closed, thereby permitting actuation of only said inlet valve means when said switch means is open.

6. The improvement defined in claim 2 wherein said means for producing an electrical signal and said blocking means form a sensing device which comprises, in combination:
   a. drive member means, connected to rotate in dependence upon the rotation of such wheel about a first axis;
   b. driven member means, connected to rotate in dependence upon the rotation of said drive member means, said driven member means being in spring-restrained relationship with said drive member means thereby to allow a relative rotation between said driven and said drive member means of up to a prescribed maximum distance when said drive member means decelerates;
   c. first electrical contact means attached to said driven member means and movable relative to said drive member means up to said prescribed maximum distance when said drive member means decelerates;
   d. lever means arranged to rotate with and to pivot with respect to said drive member means about a second axis parallel to said first axis, said lever means having a center of gravity offset from said second axis;
   e. limit stop means associated with said drive member means and said lever means to limit the movement of said lever means about said second axis, said center of gravity thereby being movable from a first position offset from said first axis to a second position offset from said first axis, said first position being closer to said first axis than said second position;
   f. spring means for mechanically biasing said lever means toward said first position, thereby to allow said lever means to move outward from said first axis under the influence of centrifugal force upon rotation about said first axis; and
   g. second electrical contact means, attached to said lever means such that, when said lever means is in said first position, said first contact means can touch said second contact means when said first contact means moves relative to said drive member means and, when said lever means is in said second position, said first contact means can not touch said second contact means even when said first contact means moves said prescribed maximum distance, the touching of said first and said second contact means being operative to produce said electrical signal.

7. The improvement defined in claim 6 wherein the range of movement of said first contact means overlaps the range of movement of said second contact means, whereby, within the region of overlap, increasing rotational speeds of said drive member means result in an increase in the values of deceleration required to cause said first and said second contact means to touch.

8. The improvement defined in claim 6 wherein the angle formed by lines drawn from said center of gravity to said first and second axes is approximately a right angle, when said lever means is in said first position.

9. The improvement defined in claim 6 wherein said drive member means is arranged in the vehicle with said first axis in the vertical direction.